United States Patent
Richards et al.

(10) Patent No.: US 10,561,930 B2
(45) Date of Patent: Feb. 18, 2020

(54) DEVICE TO PROVIDE NETWORK ACCESS TO ENTERTAINMENT MACHINE

(71) Applicant: Spinner Systems, Inc., Long Island City, NY (US)

(72) Inventors: Ronald John Richards, Long Island City, NY (US); Jay Steven Adelson, Mill Valley, CA (US); Brian Stephen O'Neill, San Francisco, CA (US); Edward Bing Chun Cheung, Mitchellville, MD (US)

(73) Assignee: Spinner Systems, Inc., Long Island City, NY (US)

( * ) Notice: Subject to any disclaimer, the term of this patent is extended or adjusted under 35 U.S.C. 154(b) by 0 days.

(21) Appl. No.: 16/034,315

(22) Filed: Jul. 12, 2018

(65) Prior Publication Data

US 2019/0022519 A1  Jan. 24, 2019

Related U.S. Application Data

(60) Provisional application No. 62/535,764, filed on Jul. 21, 2017.

(51) Int. Cl.
| | |
|---|---|
| *A63F 7/02* | (2006.01) |
| *G09G 5/00* | (2006.01) |
| *G07F 17/38* | (2006.01) |
| *G07F 17/32* | (2006.01) |
| *A63F 13/67* | (2014.01) |

(52) U.S. Cl.
CPC .............. *A63F 7/027* (2013.01); *A63F 13/67* (2014.09); *G07F 17/3216* (2013.01); *G07F 17/3295* (2013.01); *G07F 17/3297* (2013.01); *G07F 17/38* (2013.01); *G09G 5/005* (2013.01); *A63F 2250/14* (2013.01); *A63F 2300/1025* (2013.01)

(58) Field of Classification Search
CPC .................................... G09G 5/00; A63F 7/02
See application file for complete search history.

(56) References Cited

U.S. PATENT DOCUMENTS

| | | | |
|---|---|---|---|
| 6,743,104 B1 * | 6/2004 | Ota | ........................ A63F 13/02 463/44 |
| 8,773,452 B2 | 7/2014 | Perlow | |
| 9,449,402 B2 | 9/2016 | Perlow | |
| 9,966,038 B2 | 5/2018 | Perlow | |
| 2002/0173354 A1 | 11/2002 | Winans | |
| 2004/0068627 A1 | 4/2004 | Sechrest | |
| 2012/0144423 A1 | 6/2012 | Kim | |

(Continued)

OTHER PUBLICATIONS

ColorDMD Displays LLC, ColorDMD, ColorDMD LED Display Installation Instructions for S.A.M., 2016.

(Continued)

*Primary Examiner* — Jason T Yen
(74) *Attorney, Agent, or Firm* — Van Pelt, Yi & James LLP

(57) ABSTRACT

A display signal associated with a pinball machine display is received. The display signal is interpreted. A network message is transmitted via a network interface based at least in part on the interpretation of the display signal.

A network message is received via a network interface. A maintenance signal associated with the network message is submitted via a communication interface, wherein the communication interface is coupled to a pinball machine coin door panel driver board.

17 Claims, 8 Drawing Sheets

(56) References Cited

U.S. PATENT DOCUMENTS

| | | | | |
|---|---|---|---|---|
| 2013/0021309 A1* | 1/2013 | Kothari | ............... | G09G 3/3466 |
| | | | | 345/211 |
| 2013/0113161 A1* | 5/2013 | Guarnieri | .................. | A63F 7/30 |
| | | | | 273/121 R |
| 2013/0116022 A1 | 5/2013 | Davison | | |
| 2014/0087819 A1* | 3/2014 | Rakestraw | .......... | G07F 17/3255 |
| | | | | 463/20 |
| 2015/0028541 A1* | 1/2015 | Murakami | ............... | A63F 7/32 |
| | | | | 273/121 A |
| 2015/0254046 A1* | 9/2015 | Hall | ....................... | G06F 3/147 |
| | | | | 345/1.3 |

OTHER PUBLICATIONS

Pinball News, All Pinball, All Free, All Around the World, www.pinballnews.com, May 2018.

* cited by examiner

US 10,561,930 B2

DEVICE TO PROVIDE NETWORK ACCESS TO ENTERTAINMENT MACHINE

CROSS REFERENCE TO OTHER APPLICATIONS

This application claims priority to U.S. Provisional Patent Application No. 62/535,764 entitled DEVICE TO PROVIDE NETWORK ACCESS TO GAME MACHINE filed Jul. 21, 2017 which is incorporated herein by reference for all purposes.

BACKGROUND OF THE INVENTION

Entertainment machines such as game machines and/or pinball machines typically use electronic and/or electrical techniques to provide input and output to a user. Many entertainment machines were designed and developed prior to the start of the $21^{st}$ century: arcade games were introduced at least as early as 1966; Japanese pachinko machines were first built during the early 1920s; and pinball machines have a heritage stemming from as early as the 1750s.

BRIEF DESCRIPTION OF THE DRAWINGS

Various embodiments of the invention are disclosed in the following detailed description and the accompanying drawings.

DETAILED DESCRIPTION

Figure 1A:
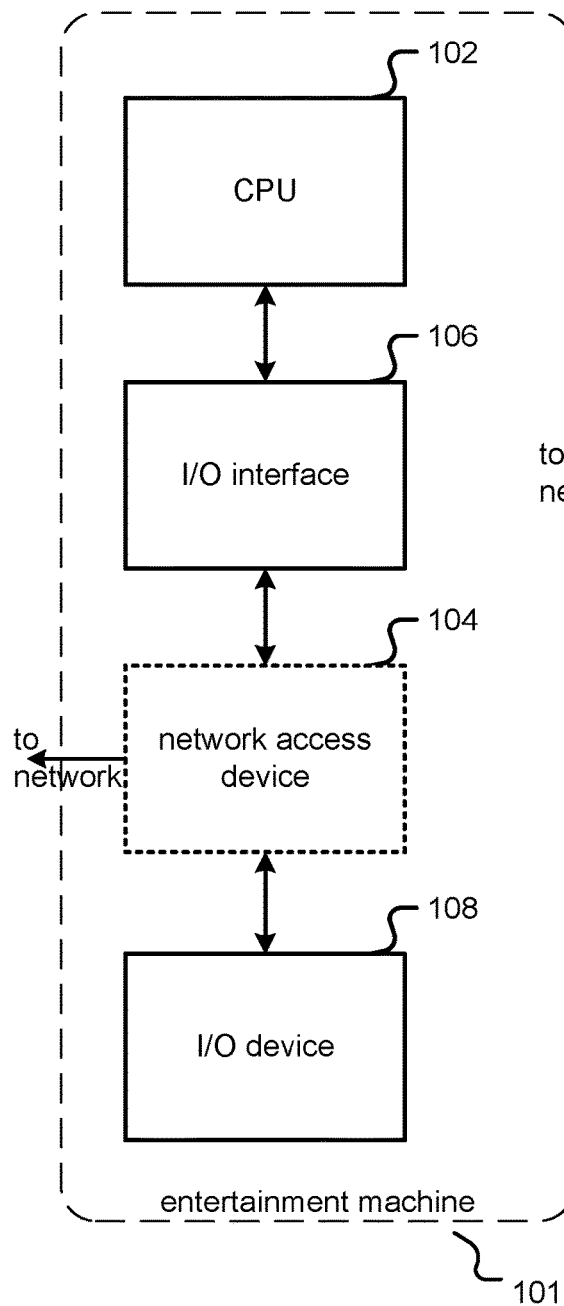
FIGS. 1A and 1B are a block diagram illustrating an embodiment of a system for providing network access to an entertainment machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing network access to an entertainment machine is disclosed. In one embodiment, the entertainment machine was designed and built without network access, for example a pinball machine or arcade game designed before 2018. In one embodiment, a network access device as disclosed herein may be used to bridge information reflecting user interaction with the entertainment machine to a network, or provide remote access to maintenance and/or other features of the entertainment machine.

Throughout this specification "network" refers to any interconnection between computer components including the Internet, Bluetooth, Bluetooth LE, WiFi, 3G, 4G, 4GLTE, GSM, Ethernet, intranet, local-area network ("LAN"), home-area network ("HAN"), cloud network, serial connection, RS-232, RS-485, RJ-45, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together.

In one embodiment, the network access device comprises a probe architecture as a modular design of providing generic access to any element of an entertainment machine including a display, a coin door, a control, a memory, and a processor. A probe may be an active probe or a passive probe. In one embodiment, the probe architecture may handle at least one of the following for an example pinball machine: a dot matrix display, a seven-segment display, an electro-mechanical display, a high definition display, a coin door, a flipper, a switch, a sensor, a plunger, a memory, and a processor.

In one embodiment, the network access device bridges information related to the entertainment machine to at least one of the following: a cloud based network, a local area network, a wide area network, a wireless network, and a wired network. This information may be related to user performance such as user scores or user achievements, and this information may also be related to audits of a state of the entertainment machine such as whether the machine is in tilt mode, whether the machine is being currently played, the number of balls provided a user per game—for example whether it is a four-ball game or five-ball game, which player is currently playing the machine, an estimate of how much money is in the machine, or whether the machine needs servicing. This information may be made associated with an API (Application Programming Interface), an application, a database query, or other computer network based techniques.

Figure 1B:
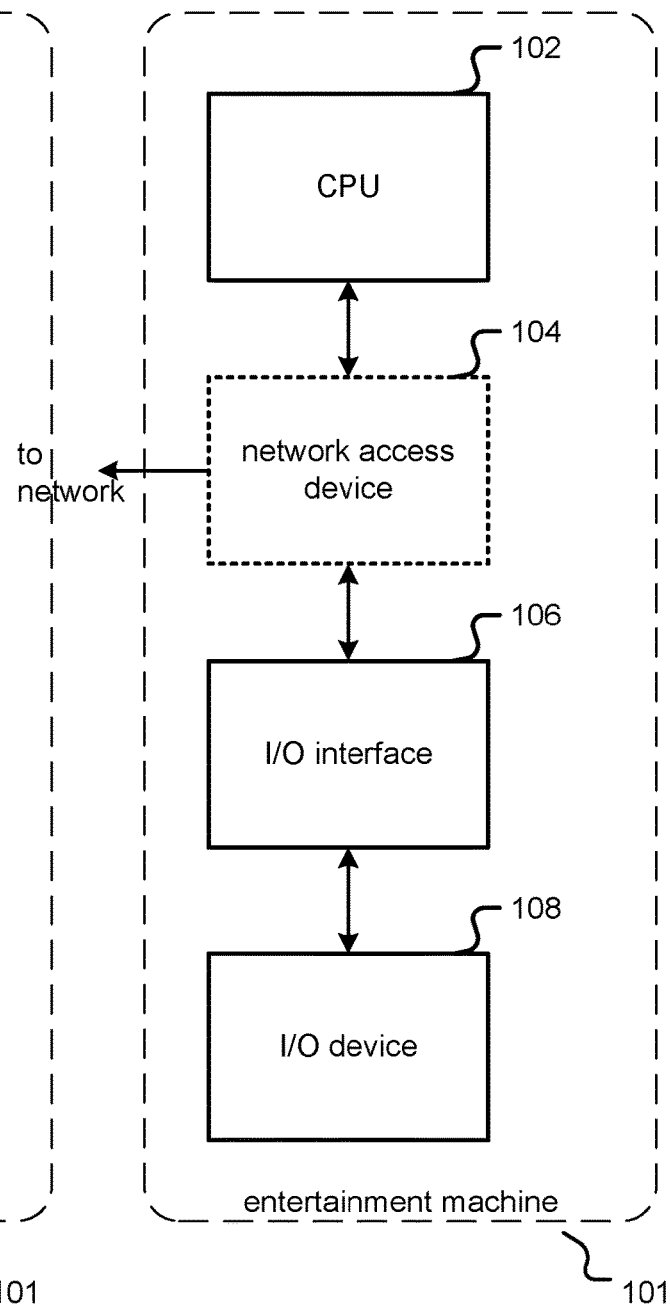

FIGS. 1A and 1B are a block diagram illustrating an embodiment of a system for providing network access to an entertainment machine. The example described in FIGS. 1A and 1B reflect a pinball machine as the entertainment machine (101), but without limitation any person of ordinary skill in the art may see that the same principles hold for any entertainment machine (101) including without limitation a game machine, an arcade machine, a pachinko machine, an electro-mechanical machine, a redemption machine, a merchandising machine, and a midway game machine.

An entertainment machine (101) comprises one of more of the blocks depicted with solid lines including a central processing unit or "CPU" (102), I/O interface (106), and an I/O device (108). One example is a pinball machine (101) with a CPU (102), display driver board (106) and a display (108) for user scores. Game machines, such as pinball machines, typically have a CPU board and/or other processor (102) configured to receive inputs reflecting user play, such as features that have been contacted or otherwise interacted with by a pinball that is currently in play in an active play area of the machine, determine based on such inputs an updated score or other information to be displayed, and use a display driver board (106) to cause updated information to be displayed on a display screen or other display device (108).

In one embodiment, a network access device (104) comprises a small, connected hardware device that includes one or more of a field programmable gate array (FPGA), a Unix implementation, Wi-Fi, Bluetooth low energy (BTLE), and display inputs and outputs. As shown in FIG. 1A, the network access device (104) may be coupled between an I/O interface (106) such as a display driver board, and an I/O device (108) such as a display, in part providing remote access to data provided from the display generator (106) to the display (108). As shown in FIG. 1B, the network access device (104) may be coupled between a CPU (102) such as a pinball CPU, and an I/O interface (106) such as a display driver board. In one embodiment, the network access device (104) may participate actively, such as by modifying signals provided to the display.

In one embodiment, the network access device (104) is physically small and installed in an entertainment machine (101) such as a pinball machine and interacts with an Internet-based Cloud API to enable enhanced tracking of data from within the entertainment machine (101).

In one embodiment, data from the network access device (104) may be used to do one or more of the following, without limitation: to keep both real-time and permanent leaderboard high score tracking on a machine/user/venue/geographic basis or any combination of these bases; to assist game owners and operators in monitoring system function and problems; for game tournament applications; and to facilitate user payment for credit on games, for example via a cloud-based or network-based service. By contrast to the leaderboard of ten or twenty high scores locally to stored in an entertainment machine, the network access device (104) enables a virtually unlimited size for the leaderboard.

Figure 2:
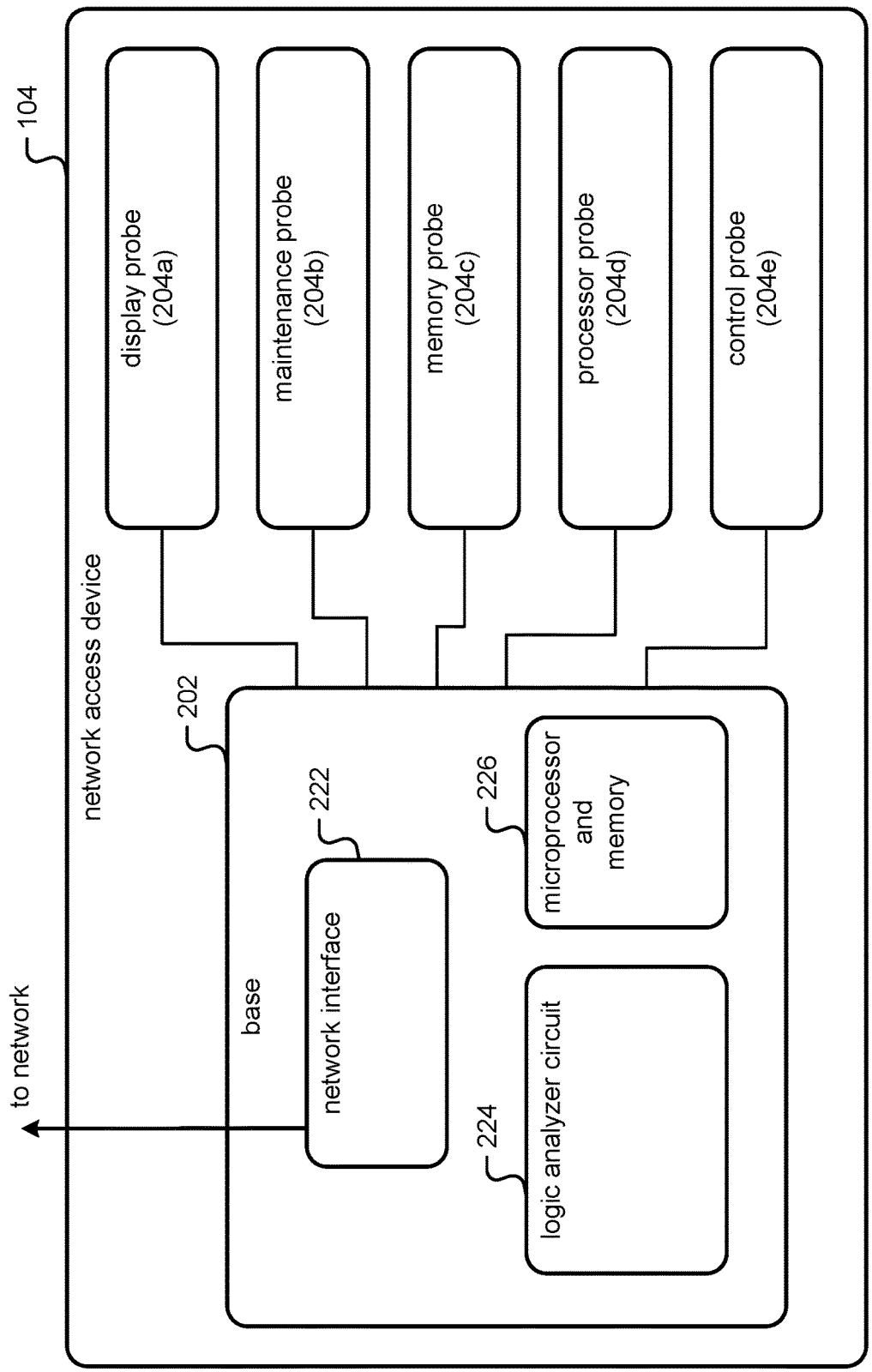
FIG. 2 is a block diagram illustrating an embodiment of a network access device.

FIG. 2 is a block diagram illustrating an embodiment of a network access device. In one embodiment, the network access device (104) of FIG. 2 is that of FIG. 1A and FIG. 1B.

In one embodiment, network access device (104) comprises a base (202) and one or more probes (204). In one embodiment, the base (202) and probe(s) (204) are mounted on a single board and/or single device and shown in FIG. 2 as a logical partitioning of subsystems. In one embodiment, the base (202) and probe(s) (204) are mounted on separate board and coupled by way of a serial cable and/or other communicating interface.

Base (202) comprises a network interface (222), a logic analyzer circuit (224), and a microprocessor and memory (226). The network interface (222) provides access to a network to deliver data for user and operator purposes. Logic analyzer circuit (224) provides an analysis of electrical signals analogous to a logic analyzer electronics instrument that captures and displays multiple signals from a digital system/circuit. In one embodiment, the logic analyzer circuit (224) is prepended with ADC (analog to digital converters) to allow the reading of electro-mechanical and/or analog signals. The microprocessor and memory (226) is configured to provide coordination between the logic analyzer (224), network interface (222) and the probe(s) (204). In one embodiment, a serializer/deserializer architecture is used between base (202) and one or more probes (204).

A probe architecture include one or more probes (204) comprising at least one of the following: a display probe (204a) associated with a display for the entertainment machine (101), a maintenance/coin door probe (204b) associated with a coin door and/or maintenance panel for the entertainment machine, a memory probe (204c) associated with a RAM (random access memory) for the entertainment machine, a processor probe (204d) associated with a CPU for the entertainment machine, and a control probe (204e) associated with a control such as flippers, a plunger, a joystick, and/or buttons for the entertainment machine. In one embodiment, the probes are passive devices that listen electrically at various interfaces in the entertainment machine (101). In one embodiment, the probes are active devices that may listen and/or emulate a display driver board (106), maintenance panel (106), or a control (106).

In one embodiment, there may be multiple different display probes (204a), for example an electro-mechanical display probe (204a), a solid state display probe (204a), a seven-segment display probe (204a), a DMD (dot matrix display) display probe (204a), and an HD (high definition)/4K display probe (204a). In one embodiment, for a DMD probe (204a), there may be different styles of probes each relating to a particular entertainment machine, for example for a specific set of pinball machines.

In one embodiment, as a use case the base (202) may use one or more of the following:
- a Xilinx Zynq series FPGA with dual-core ARM. In one embodiment, a different FPGA is used, and in one embodiment a custom ASIC is used;
- a wireless networking chip, which may include WiFi, Bluetooth LE, NFC, and/or other proximity protocols to communicate with the Internet/cloud and/or process a payment system for example Apple Pay/Android Pay/Samsung Pay with a player application;
- an SD card socket with softswitch, allowing the device (104) to be seen as a USB key in certain situations such as flashing software/firmware on pinball machines (101);
- LVDS input and output for HD and/or 4 k video processing, for example for more modern machine video processing;

4 pin power connector inputs and outputs to provide power from an entertainment machine (101) and pass through to originally intended component;

a WiFi antenna such as an external WiFi antenna;

a set of USB-C ports, for example four ports to connect to external probe PCBs;

a set of RJ45/RS485 ports with necessary transceiver/receiver components to connect to certain machines with an appropriate bus, for example mimicking the Stern RS-485 bus using a RJ-45 form-factor. This may allow, for example, network access device (104) to either monitor the machine bus and/or behave like an RS-485 node;

a USB 2.0 receptacle to emulate a USB drive to assist in upgrading firmware. For example a Stern pinball machine, "Guardians of the Galaxy", includes a pre-designed feature to allow a USB drive to be connected to the machine MPU to upgrade software and/or firmware. A cable may be connected from this USB 2.0 receptacle on network access device (104) to the USB drive receptacle on the machine MPU/CPU (102) to allow software and/or firmware to be received via the network and upgrade on the fly without a human operator opening the maintenance panel;

a reset button for onboarding/resetting to defaults; and an LED status indicator for power, device status, etc.

Figure 3:
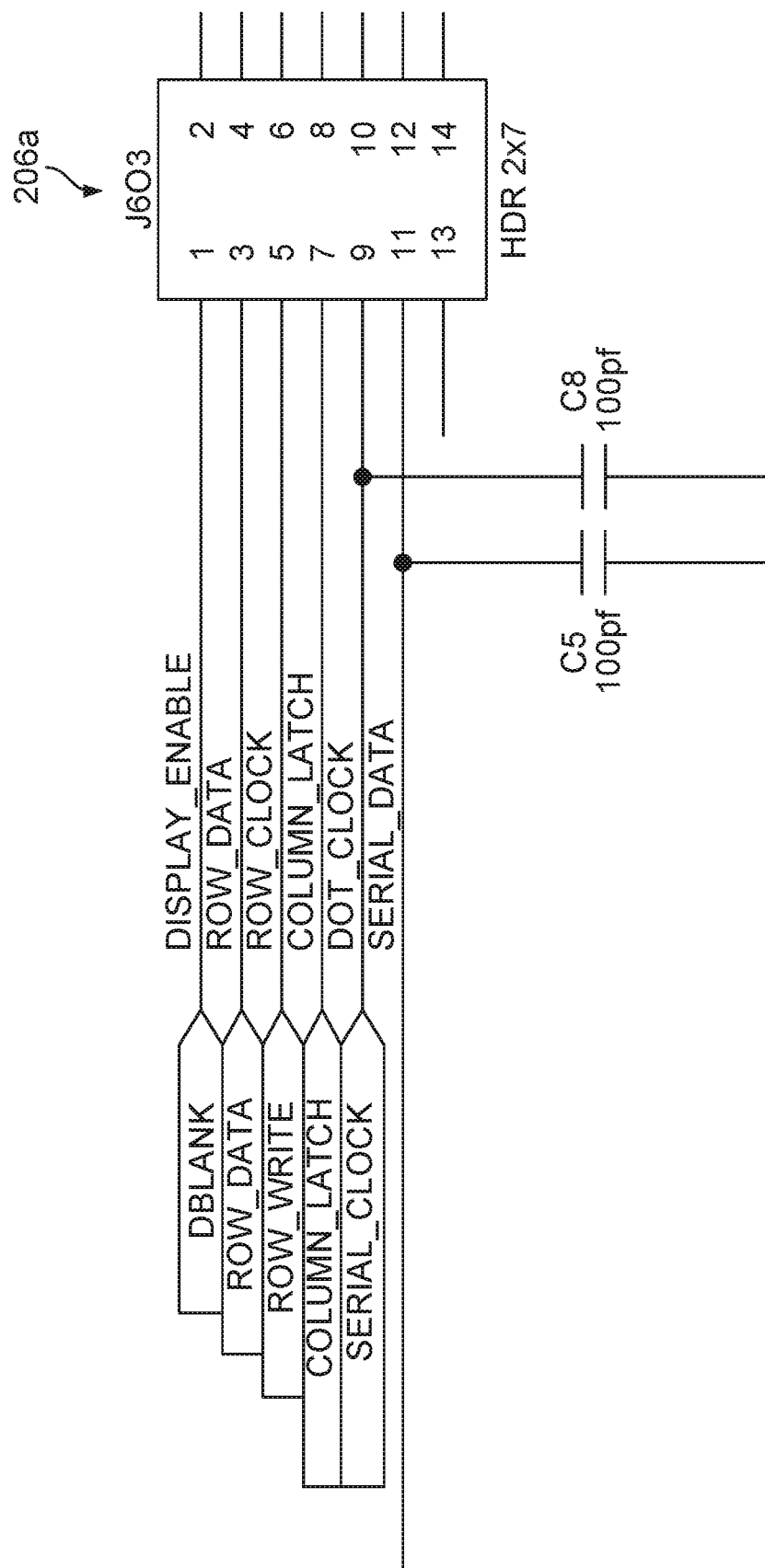
FIG. 3 is an illustration of a typical 14-pin connector for some DMD based pinball machines.

In one embodiment, as a use case an example of a probe (204) is a DMD probe (204a). DMD displays may be found on pinball machines (101) of a certain era. Those displays typically use a 14 pin connector with 6 or 7 lines utilized. FIG. 3 is an illustration of a typical 14-pin connector for some DMD based pinball machines. Such pinball machines generate a signal at approximately 100 Hz with a pixel resolution of 128 columns by 32 rows, which is sent across the 14 pin ribbon cable (206a) on six wires: Display Enable, Row Data, Row Clock, Column Latch, Dot Clock, and Serial Data. The DMD probe has a 14 pin connector that allows an entertainment machine operator to press the probe onto the 14 pin connector on such a pinball machine (101). On the front of the PCB, there may be a 14 pin connector to connect the original DMD display to, in order to conserve cabling so that no extra cables are used, provide snug/secure housing of the assembly, and/or shorten cable run for electrical/physical efficiency.

The DMD probe (204a) captures the current signals coming from the display driver (106) and sends them across a USB C cable to the baseboard (202), where it is mapped to specific FPGA pins. The baseboard (224) processes the signal, and then sends information back to the probe (204a), which in turn pushes this signal out to the display (108). The DMD probe (204a) is active, meaning that it requires power via the USB C cable, and it is capable of displaying whatever is sent to it, so that the DMD screen (108) may be manipulated beyond the intention of the original game designer.

In one embodiment, as a use case a seven-segment probe (204a) operates in a very similar fashion to the DMD probe (204a). It presses onto a 28 pin connector on 1980's era pinball machine (MPUs) multi-processing units (106). Like the DMD probe, it sends those signals to the baseboard (202), which processes it and sends back signals which in turn is sent on to the display (108). One difference between a seven-segment probe and DMD probe is that instead of reading pixels of a screen and individual frames using the logic analyzer (224), digit information is being read with the logic analyzer (224) instead so it is known what is currently displayed on the PLAYER 1, PLAYER 2, PLAYER 3, PLAYER 4 seven-segment LED displays as well as the BALL and PLAYER number. This digital information is extracted and then sent via network interface (222), for example to an API with extracted scores from displays.

In one embodiment, a maintenance/coin door probe (204b), a CPU Logic Probe (204d) to read information passed from the CPU (102) itself for better resolution on game data, seven-segment probes for different machine types that are not a 28 pin connector (204a), and an LVDS/modern video probe (204a) are also available for an entertainment machine (101).

Figure 4A:
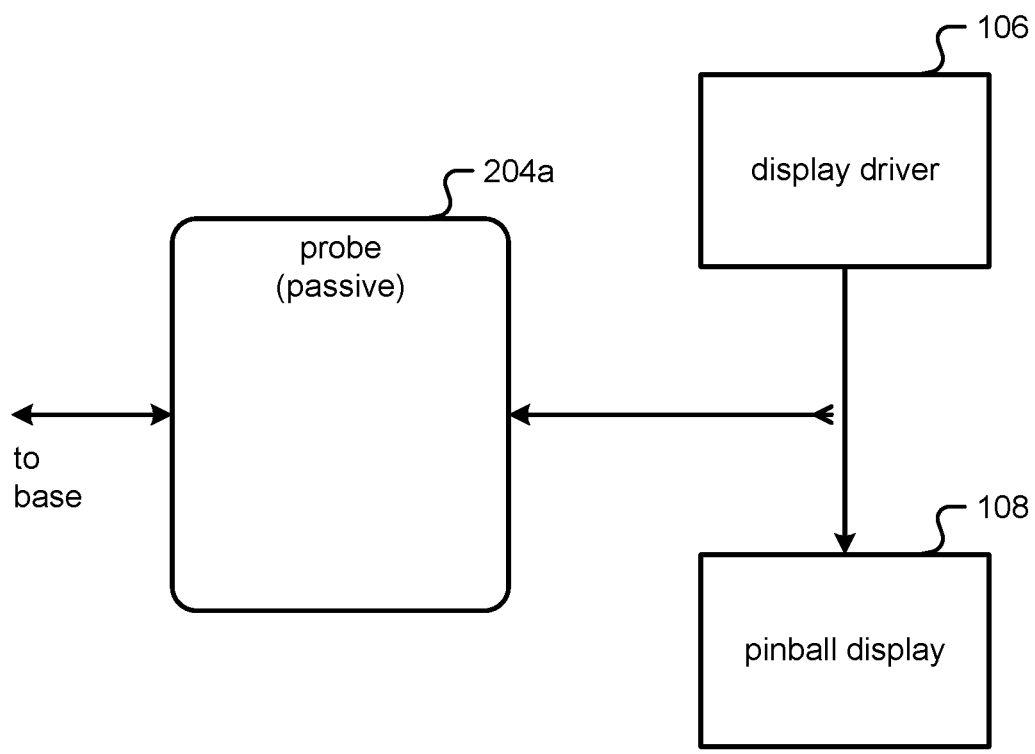
FIG. 4A is a block diagram illustrating an embodiment of a system for a passive display probe.

FIG. 4A is a block diagram illustrating an embodiment of a system for a passive display probe. Without limitation, the probe is shown coupled to display driver (106) and pinball display (108) corresponding to FIG. 1A, but any person of ordinary skill in the art understands that the probe may alternately be coupled between CPU (102) and display driver (106), corresponding to FIG. 1B.

Without limitation, an embodiment for a common DMD display in certain pinball machines (101) is as follows: The display controller/driver (106) sends to the display (108) via the display cable as shown in FIG. 3 display data that includes for each of the 32 rows pixel data for the 128 columns in that row, and follows with an end of frame signal as defined by the display controller's local clock. Pinball machine hardware is designed to interpret these signals from interpreting the waveform highs and lows to generate a digital representation of the pixels for the purposes of putting on the local display (108). In some implementations, each "frame" includes 128 columns by 32 rows, and to create shading, each frame has three sub frames that will sometimes flash pixels on and off.

In one embodiment, a network access/connectivity device (204a) passively monitors this display signal on its way between the display controller (106) and the display (108), and passes it to the base (202). Logic (224) and/or code (226) such as that within an FPGA takes each row as it is generated by the pinball display controller and interprets the pixels from the waveform and passes each row sequentially in digital form to computer program code, for example running on Linux on the device.

In one embodiment, this is done through a Linux device driver used as a character device, accessible through client code. Each row is assembled until there are 32 rows, at which point all 32 rows are considered a single sub frame. Three sub frames are considered a frame. As the running program receives each completed frame, it determines if players' scores are displayed on the screen. If they are, those scores are read into local variables and passed to a remote/cloud-based API via a network interface (222). In one embodiment, scores are passed to the API continuously or at different rates depending on the rate at which they change. In one embodiment, scores are sent once per second or faster.

Figure 4B:
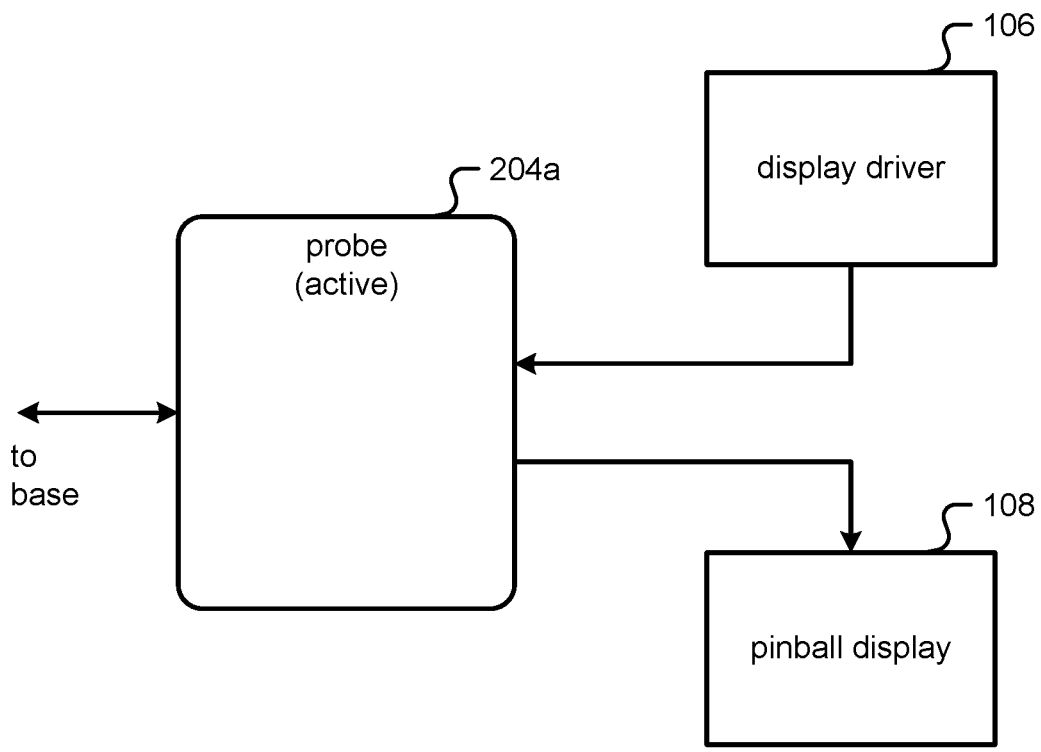
FIG. 4B is a block diagram illustrating an embodiment of a system for an active display probe.

FIG. 4B is a block diagram illustrating an embodiment of a system for an active display probe. Without limitation, the probe is shown coupled to display driver (106) and pinball display (108) corresponding to FIG. 1A, but any person of ordinary skill in the art understands that the probe may alternately be coupled between CPU (102) and display driver (106), corresponding to FIG. 1B.

As shown in FIG. 4B, the probe (204a) receives display data from a display driver (106) originally designed/intended for pinball display (108). The probe (204a) is coupled to base (202). As referred to herein, an "active" probe is any probe (204) that may either pass-through or alternately alter probed data. In the case of FIG. 4B, the probe may thus pass-through display data, such as scores of a player, but may also actively inject a message for display (108) such as a gaming achievement earned by the player. Examples of a gaming achievement may include a "rapid fire" achievement if a score of 100,000 is reached in less than 10 minutes, which may be injected on display (108) as well as shown on a user application such as application (608a) in FIG. 6 as, for example, a rapid fire trophy. In one embodiment, a language associated with a user of application (608a) is used for any message from the active probe (204) to display (108) to provide multi-language support, for example English, French, Spanish, German, and Portuguese.

Figure 5A:
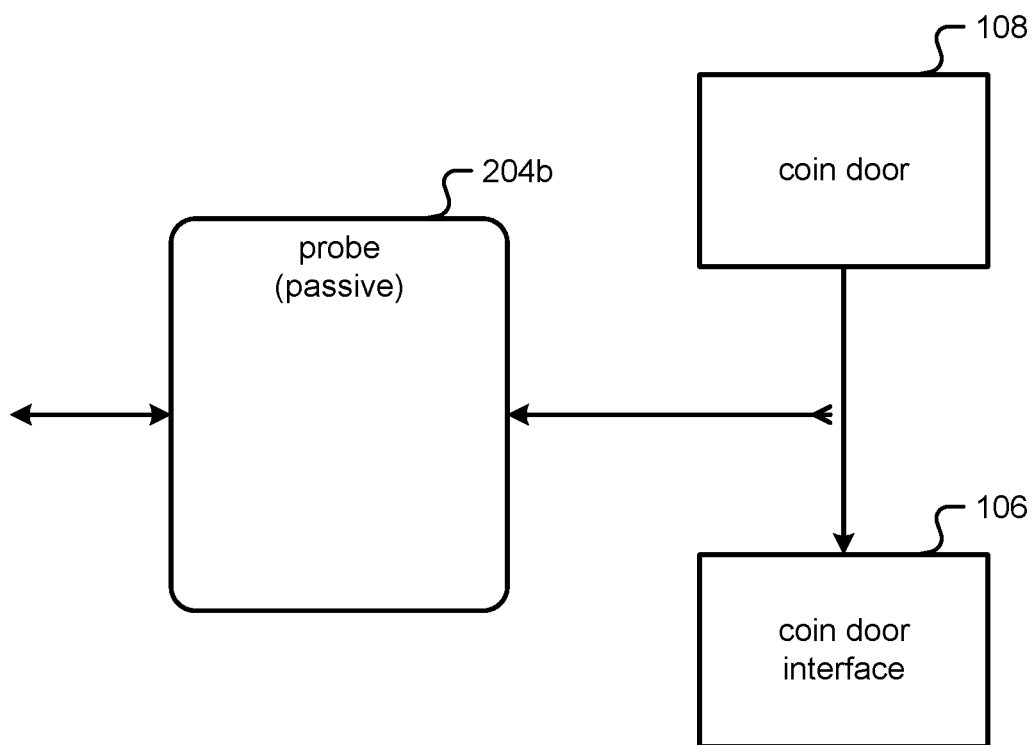
FIG. 5A is a block diagram illustrating an embodiment of a system for a passive maintenance probe.

FIG. 5A is a block diagram illustrating an embodiment of a system for a passive maintenance probe. Without limitation, the probe (204b) is shown coupled to coin door interface (106) and coin door (108) corresponding to FIG. 1A, but any person of ordinary skill in the art understands that the probe may alternately be coupled between CPU (102) and coin door interface (106), corresponding to FIG. 1B.

In one embodiment, a probe (204b) has I/O capability to interface with coin door operations of the machine. In one embodiment, such an interface may be used with base (202) to perform credit and maintenance menu manipulation and/or related operations. Entertainment machines including arcade machines and/or pinball machines may have a front panel on the lower cabinet of the machine used to receive coins. When this panel, referred to herein as a "coin door," is opened, there may be revealed a multi-button switch, for example a four button switch, on the back side that allows access to maintenance features of the pinball machine.

For example, one button may be labeled "+" which displays an operator menu, which allows an operator to use these buttons to navigate to various features and tests and allow them to be changed. For example, the arcade/pinball machine may be put into a test where it displays what switches or solenoids are broken and needing repair, or an operator may change how much money is required for a single game. With the coin door open, one can use these buttons to add "credit" without using coins through the front of the coin door, wherein credit is referred to herein as any value which is exchanged for entertainment and/or playing games. In one embodiment, a passive probe (204b) is connected to the entertainment/pinball/arcade machine's MPU board and/or coin door interface board via a ribbon cable.

Figure 5B:
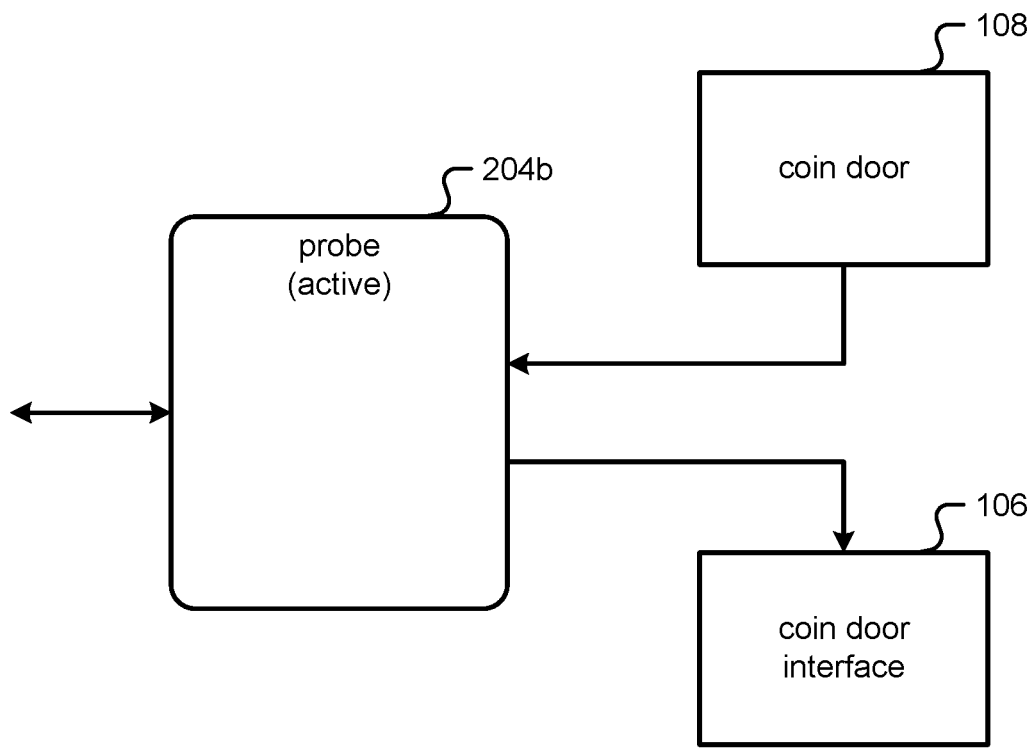
FIG. 5B is a block diagram illustrating an embodiment of a system for an active maintenance probe.

FIG. 5B is a block diagram illustrating an embodiment of a system for an active maintenance probe. Without limitation, the probe (204b) is shown coupled to coin door interface (106) and coin door (108) corresponding to FIG. 1A, but any person of ordinary skill in the art understands that the probe may alternately be coupled between CPU (102) and coin door interface (106), corresponding to FIG. 1B.

In one embodiment, an active probe (204b) is connected to the entertainment/pinball/arcade machine's MPU board and/or coin door interface board via a ribbon cable. Once connected, the active probe (204b) may monitor but also send menu commands as if a person was pressing the buttons on the coin door. For example, the device (104) including active probe (204b) may be used to remotely enter test modes, change feature settings, and/or add credit the machine as if a person was doing so via the physical buttons. In one embodiment, because the device (1040) also is monitoring the pinball machine's display, it may interpret the results of these tests and pass that information to the remote operator. The device (104) may also add or remove credit from the machine to enable or disable game play.

Figure 6:
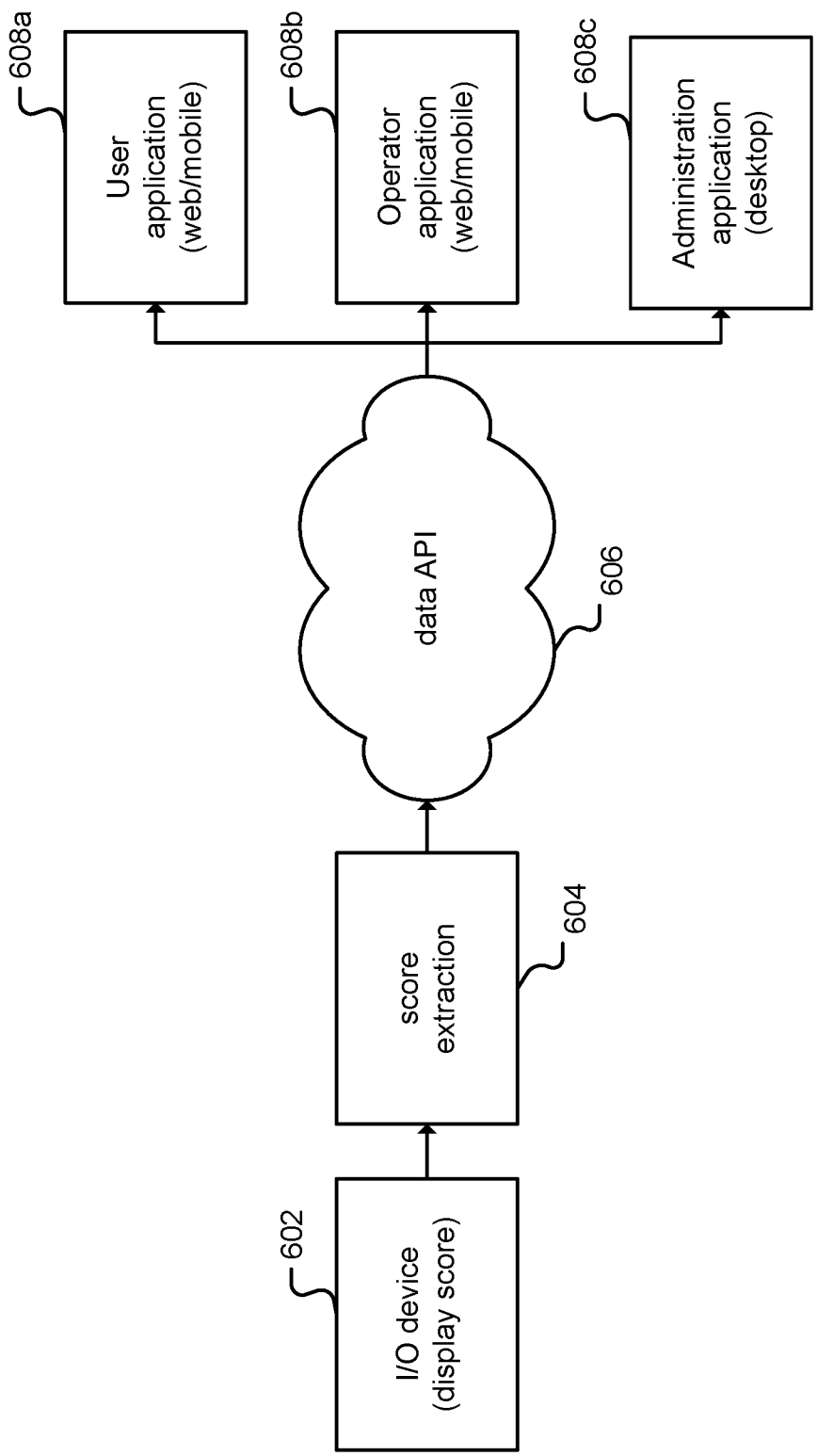
FIG. 6 is a block diagram illustrating an embodiment of a data workflow for an entertainment machine network access device.

FIG. 6 is a block diagram illustrating an embodiment of a data workflow for an entertainment machine network access device. In one embodiment, the data workflow of FIG. 6 is carried about by network access device (104) in FIG. 1.

In one embodiment, device (104) runs a combination of software that is designed to monitor game data, interface with the machine operations, and/or maintain a connection to the Internet. In one embodiment, a remote cloud-based service, local and remote players, and/or operators of the game may interact with functions of the software via the device's connection to the Internet.

In one embodiment, the software running on the device (104) translates the signal (602) coming in through the display interface (106) into digital representations of frames (604). These frames include score data for all players, but also include other frames the can indicate game modes and achievements as well as maintenance information. Each frame is then processed and the relevant information is extracted from the frame in real-time. Unaltered display signal may then passed through to the machine's display (108), or enhanced display signal may also be passed to the machine's display (108) such as showing a player achievement.

In one embodiment, game score data is sent to a remote, cloud-based service (606) for example via API calls sent by the device (104) to the service via the Internet. Thus, the device (104) extracts scores in real-time (604), and transmits updates to the Internet cloud-based API (606).

Score extraction (604) may take place, for example between logic circuit (224) and the microprocessor/memory (226) in device (104). The score extraction process may run on an Ubuntu instance and be running nearly at all times as a primary process running on processor (226). In one embodiment, a Linux instance is used. In one embodiment, a Unix instance is used. In one embodiment, a Windows, Mac OSX, or other operating system instance is used. In one embodiment, an embedded instance without an operating system is used. This application (604) may read and extract score and other game information from video frames and forward that information to an API (606) in real time.

For example and without limitation, pinball machines developed since the early 1990's may have small, dot matrix screens on the "backbox" or upper part of the machine. These displays are low resolution, 128×32 pixels or 128×96 pixels. They present players with animated frames of scores, game information, credits, and other information relevant to the player. Pinball machines developed between the mid-1970's to the early 1990's may have five 7-segment style LED displays that display scores, game information, credits and other information that are also relevant to the player.

Separate display probes (204a) may captures either the dot matrix frames or the 7-segment information in real-time and sends them to this application (604) for processing. This application (604) reads the frames from the logic analyzer, pre-processes those frames for any color management and/or de-duplication, then examines the frames in real-time to extract information. To extract that information, game-specific templates may be loaded identifying the digits and other patterns necessary to match for that specific game, as described below using the trainer application (608c), using at least one of the following: training, optical-character recognition, and machine learning. Without limitation, the example below describes one of many possible training techniques. The extracted information is passed to an API hosted in the cloud (606).

In one embodiment, the USB C ports may be used to take input from one or several webcams, for the use of encoding and streaming live video of the player. These encoded video sources may be merged with the current game display for various purposes, including output as a live stream, or output to a local video display.

In one embodiment, the baseboard may also have a video display HDMI output used for the purpose of displaying scores, achievements, various visualizations of game play information, or live video streams.

Without limitation, as an example of a use-case this application (604) may be separated into three modules: Pre-processing, template management, and score-extraction.

Module 1: Pre-Processing.

Frames arrive in a continuous stream to a character or memory device. Frames are encoded using the same method as the Trainer App (608c), where four pixels are represented by an ASCII character. End of rows are indicated by a @ sign, and end of frames are indicated by a + sign. Frames may also be encoded digitally and sent without ASCII encoding.

There may be several different types of incoming pinball machine frame types to auto-configure to and/or manually configure to an appropriate machine types for example and without limitation: a WPC (Williams Pinball Controller), an SAM (Stern SAM platform), and 7-segment Displays.

For Williams games, there are up to four brightness levels for each pixel. To determine the brightness, every pixel's bit depth is added to the same pixel for the two frames that follow it, which results into one merged frame for every three frames—that is, summing the value of three consecutive frames for each pixel. For example, if one has 0 time value 0, it is color #0, if one has three times value 1, it is color 3. Thus, three consecutive frames allow four possible values (000, 100, 110, 111). The result is that every pixel is either a 0, 1, 2 or 3, where 0 means the pixel is off.

For Stern, every row of pixels is sent four times. The four rows are then merged in real-time of four consecutive frames to achieve a merged value for the brightness of each pixel. Thus, each 4-bit row is sent as four 1-bit rows. One has to recombine them once they have all been received. For Stern SAM, the timing between each 1-bit lines is different, based on the weight of each bit in a nibble.

For 7-Segment displays, there are no dot-matrix style frames. Instead, for each cycle, there are five rows sent. The first row contains up to 7 alpha-numeric characters, including either numerical digits, alphabetical letters, or symbols such as an asterisk, based on what is possible with 7-segment LED-style displays, associated with PLAYER 1. The second is for PLAYER 2, and so forth until the fourth row for PLAYER 4. The fifth row includes information on the current player number, the current ball number, and if a game is over or not.

Once one has colored frames or 7-segment display strings in memory, the next step of pre-processing is to remove successive duplicates. Finally, the last step of pre-processing is to do any necessary frame manipulation, such as making them monochromatic, for the third module, score-extraction.

Module 2: Template Management.

The second module is only relevant for dot-matrix displays by loading the game specific template into memory. This includes the bitmap of every font for every digit, matching patterns, or score regions appropriate for score extraction and game mode information that may be used in the third module. This template management loads this information from a text file and/or binary firmware file that includes the machine type.

Module 3: Score and Game Mode Extraction.

The application proceeds continuously until the hardware is shut off. If the machine type is 7-segment, the information is converted to digital values and sent to the API (606). If the machine type is Dot Matrix, as each frame enters the buffer, the module determines if the frame has valuable information on it. If it does, that information is extracted and passed to the API (606).

Game Active. If the words PLAYER 1(or 2, 3, or 4), or BALL 1 (or 2, 3, or 4) are seen, or 00 is seen in any of the score regions, the game is currently active.

Game Over. If the words GAME OVER is seen, the game is currently over.

Final Score. There is generally a frame, after the game is over, where all the scores are listed at the same time. This final score frame may be identified because it will also say CREDITS or FREE PLAY in a certain position which will determine that the game is over and those are the final scores. Also the final score frame typically has all scores in the small format instead of one being in a larger format.

Player Number. If the words PLAYER 1 (or 2, 3 or 4) are seen, the appropriate player number is changed.

Ball Number. If the words BALL 1 (or 2, 3, 4 or 5) are seen, the appropriate ball number is changed.

Multiple Score Frame. If the frame is determined to be a frame that contains score information for all players such as a list, all player scores are matched and extracted.

Single Score Frame If the frame is determined to be a frame that has only ONE score on it, the CURRENT PLAYER's score is updated.

Tilt. If the frame is determined to be a TILT frame, the player number is advanced.

An API specification is provided with the appropriate API calls to push the appropriate information to the API (606). Score data (when it changes) and game active/over data is pushed to the API, for example. Once a cycle has completed, the next UNIQUE frame is processed.

As score-extraction methodology consumes significant CPU cycles, the FPGA logic fabric (224) is used to reduce the overhead. Code (226) is kept as efficient as possible to keep up with the frame stream and in some cases a certain number of frames per second are thrown out in order to reduce the overhead, for example decimated to one frame per second. For example, an AXI/AXI4/AXI4-stream bus may be used to handle the bandwidth. In one embodiment, a dynamic clock generation circuit is used to provide, for example, 10 MHz clock sampling for older entertainment machines, and a 40 MHz clock sampling for newer entertainment machines, based on an identifier for the entertainment machine.

Once score data has been stored within the cloud service, score data may be used in a variety of applications by users. The API may receive scoring data in real-time into anonymous and ephemeral variables by default associated with a game/machine ID corresponding to an identifier for a given device (104). An application (608) may then use the API (606).

In one embodiment, once a player has identified himself or herself as playing via a separate application (608a) connected to the API, their identity may be associated with that player number for that game and recorded on a permanent leaderboard for that game, as well in their own history of scores and machines played. In one embodiment, the remote service API powers applications such as a Player application (608a), which enables players to "Check-In" to a gaming machine and have their final score extracted and saved to a database maintained by the service. In one embodiment, other applications leverage the API machine and leaderboard data, such as an Operator application, tournament applications or direct machine integrations.

In one embodiment, an application may be used to allow players to message each other for different purposes, including challenging another player with a higher score, achievement, or other game play information.

In one embodiment, an application may be used to allow real-time competition between two players or teams of players. A game request against a competitor is activated, and once it begins, the live score of each player may be compared until a winner is determined at the end of the game. In one embodiment, live video may be added via the webcams connected to the USB C ports to allow a player or players to see a remote player or players within the application or on a local display via the HDMI port.

Player Application UI Flow. Without limitation, an example Player application (608*a*) includes UI flows such as:

Single Player Playthrough. This sequence covers what a single player game looks like. It is important to note that the only distinction between a "single player" and "multiplayer" game is how many players are being tracked on one pinball game at a time. A game is only single player until another player joins the game (under the correct "before-the-first-ball-is-sunk" conditions).

1) Confirm Venue. Here, the user confirms their location and venue. This is the context in which all other interaction states are set.
2) Select Game. Here, the user browses the list of available games. In this view, the user may see what venue they are currently occupying. Additionally, the user may search or sort through the machine list with a tool bar, or add a new machine by tapping a button.
3) Select Player Step. After the user selects a game to play, player slots (1-4) may display and become interactive. From here the user may select any player they wish, as long as the slot has not been already taken by another player. Adequate funds need to be deposited in order for users to connect to a slot. Inadequate or no funds results in a permissions message. As the slots are taken, the username of the player occupying the slot prints and may appear to everyone currently in this view.
4) Player Selected—Single Player. Once the user has deposited appropriate funds, the player slots become interactive. The user may select their desired player number by tapping the corresponding player slot. Cancelling may take the user out of the machine and into the machine list. A button is displayed disabled with a message "waiting for start . . . "
5) Live Game—Single Player—"Pre Sink". After the user has deposited funds, picked a player slot, and pressed the pinball machine's start button, the app may start tracking the game. The score is displayed on the user's selected player slot alongside their username. Before the first ball is sunk, other players have the ability to join the game. During this period, any unclaimed player slots may display "Player X Unclaimed" and may also be dimmed as inactive. The button may also be displayed as disabled, with a message "Game in Progress . . . "
6) Live Game—Single Player—"Post Sink". After the first ball has been sunk, all unclaimed player slots may be hidden and inactive. In this state the game is locked and no more players may join. This is designed to be a visual cue (affordance) that indicates the game is unjoinable. If a new user adds funds and presses the start button on the pinball machine, the funds may only activate a new game once the current game is concluded. This type of event may currently not register on the app during a current game. Button "Game in Progress . . . "
7) Game Concluded—Submit Score. Once the game has concluded the disabled button becomes an active "Submit Score" button. In this state, each player may have the ability to submit their own scores to their scores list. Player's scores (that is, the score that may be submitted and saved to the list) are highlighted in this view.

Additional Players Joining an Active Game. This sequence outlines how additional players join an active game. This is basically how multiplayer works. It is important to note that in order for players to join an active game, the preceding player must still be on their first ball. After their first ball is sunk, the game may no longer be joined by new players. So, for clarification, if player 1 is still on their first ball, player 2 may join. If player 2 is still on their first ball, then player 3 may join, etc.

1) Confirm Venue. Here, the user confirms their location and venue. This is the context in which all other interaction states are set.
2) Additional Player Selects Game. Here, the user browses the list of available games. In this view, the user may see what venue they are currently occupying. Additionally, the user may search or sort through the machine list with a tool bar, or add a new machine by tapping a button. If the game is playable, they may start a new game (if no one is playing) or join a game in progress.
3) Selection Additional Player. After the user selects a game to play, here player slots (2-4) may display and become interactive. In this case, player slot 1 is occupied. From here the user may select any available player they wish, as long as the slot has not been already taken by another player. Adequate funds need to be deposited in order for users to connect to a slot. As the slots are taken, the username of the player occupying the slot prints and may appear to everyone currently in this view.
4) Waiting to Start view. After the user has selected their player slot, the slot may highlight and display the message "Waiting for Player X to start . . . "
5) No Player Active Message. If the user has not satisfied the funds threshold or pushed the start button they may be presented with this message. This happens when their score counter does not activate. The result is the API communicates this message.
6) Live Game View Player Initialize. In an active game scenario, all active players and scores may be displayed in their corresponding player slots. As a player's turn activates, their corresponding player slot differentiates itself from the others by dimming the non active player slots. Below is a disabled button that prints "Game in progress . . . " Below is the Cancel button. In this case, when the score counter starts the user sees the UI check mark followed by . . . .
7) Live Game View Score Counting . . . the user seeing the score zero'd out before it starts to count. This indicates that the score is about to start counting as the ball hits its targets and increases the numbers.
8) Live Game post "First Drain". After the first ball drains the game may lock. When this occurs any unclaimed slots may be hidden from view as a visual affordance that game is no longer able to be joined.
9) Game Concluded—Submit Score. Once the game has concluded the disabled button becomes an active "Submit Score" button. In this state, each player may have the ability to submit their own scores to their scores list.

Player's scores (that is, the score that may be submitted and saved to the list) are highlighted in this view.

Spectator Flow. This sequence illustrates how a non-participant user may watch a game already in session. This view may only look like this if either all the player slots are taken or if the first ball of the last player to join has been already sunk. Users who select games in these contexts may only be able to spectate a game in session. Hitting the Cancel button or back arrow in an app bar may take the user back to the machine list.

1) Confirm Venue. Here, the user confirms their location and venue. This is the context in which all other interaction states are set.
2) Additional Player Selects Game. Here, the user browses the list of available games. In this view, the user may see what venue they are currently occupying. Additionally, the user may search or sort through the machine list with a tool bar, or add a new machine by tapping a button. If the game is playable, they may start a new game (if no one is playing) or join a game in progress.
3) Live Game View. In an active game scenario, all active players and scores may be displayed in their corresponding player slots. As a player's turn activates, their corresponding player slot differentiates itself from the others by dimming the non active player slots. Below is a disabled button that prints "Game in progress . . . " Below is a Cancel button.
4) Start New Game—After spectator. After the present game is over, any spectators may have the ability to start a new game, provided they add physical funds and press start. This basically results in a new play flow.

Cancel or Back Arrow. This sequence illustrates what happens when a user decides to Cancel during a live game (or anytime they are in a machine view). Cancel takes the user out of machine view and displays the venue's machine list.

1) Select Game. Here, the user browses the list of available games. In this view, the user may see what venue they are currently occupying. Additionally, the user may search or sort through the machine list with a tool bar, or add a new machine by tapping the button.
2) Select Player Step. After the user selects a game to play, player slots (1-4) may display and become interactive. From here the user may select any player they wish, as long as the slot has not been already taken by another player. Adequate funds need to be deposited in order for users to connect to a slot. Inadequate or no funds results in a permissions message. As the slots are taken, the username of the player occupying the slot prints and may appear to everyone currently in this view.
3) Player Selected—Single Player. Once the user has deposited appropriate funds, the player slots become interactive. The user may select their desired player number by tapping the corresponding player slot. Cancelling may take the user out of the machine and into the machine list. The lower button is displayed disabled with a message "waiting for start . . . "
4) Live Game—pre Cancel button. After as the user has deposited funds, picked a player slot, and pressed the pinball machine's start button, the app may start tracking the game. The score is displayed on the user's selected player slot alongside their username. Before the first ball is sunk, other players have the ability to join the game. During this period, any unclaimed player slots may display "Player X Unclaimed" and may also be dimmed as inactive. The lower button may also be displayed as disabled, with a message "Game in Progress . . . "
5) Canceling a Live Game. Here the user is seen tapping the Cancel button during a game. If this happens, the user it taking out of the game tracker and back into the Machine List. Hitting Cancel at any stage (or back arrow) may terminate the current view and take the user back to the Machine List
6) Machine List after Cancel. The user it taken back to the Machine List view when they hit Cancel.

Scores View. The Scores View is where user's scores are stored and interacted with. A pinball machine connected with the app (608a) has the ability to record all of the user's plays and a variety of metadata surrounding the play events. The default view of the Scores is as a list. Each list item is expandable into a modal that may also be shared via email and text as a PDF. Scores are accessible from an icon labeled "Scores." When selected the icon and label are highlighted, and "Play" is dimmed.

1) Game Concluded—Submit Score. Once the game has concluded the disabled button becomes an active "Submit Score" button. In this state, each player may have the ability to submit their own scores to their scores list. Player's scores (that is, the score that may be submitted and saved to the list) are highlighted in this view. Hitting the "Submit Score" button may automatically take the user to their score list.
2) Score List View 1. In this view, the user is presented with their scores in list fashion. Each list item consists of the Machine Name, Date/Time Stamp, and the score. The list is scrollable and each list item is expandable to a modal. Additionally, the Score List is sortable by Date/Time, Venue, Scores, and Machines. The default display is in chronological order by Date/Time Stamp.
3) Score List View 2. In this view, the user is presented with their scores in list fashion. Each list item consists of the Machine Name, Date/Time Stamp, and the score. The list is scrollable and each list item is expandable to a modal. Additionally, the Score List is sortable by Date/Time, Venue, Scores, and Machines. The default display is in chronological order by Date/Time Stamp.
4) Score List Modal. The modal in this view is meant as an expansion of the data presented in the score meta data in the list view. When a score event is shared, it may be presented like this.

In addition to a Player application (608a) which allows a user identity to be associated with a given score, other applications using the API are provided in various embodiments. In one embodiment, an Operator application (608b) interfaces with the API to allow a device (104) to be configured, registered, and associated with a machine. In one embodiment, the Operator application (608b) allows an Operator to remotely monitor and configure a pinball machine through the coin door interface. Other web-based and app-based applications (608) in various embodiments include tournament integration and visualization as well as global leaderboard discovery and visualization.

Operator Application UI Flow. Without limitation, an example Player application (608b) includes UI flows such as:

Splash Page to Log In/Splash Page. This sequence covers the Splash Page to Sign Up Log In flow. Users see the splash page with animates to Sign Up/Log In page.

1) Splash Page. Application (608b) displays this splash page while loading the Sign Up/Log In view.
2) Sign Up/Log In view. After loading, if the user has not logged in or signed up, they may be presented with this page Sign Up Flow. This sequence covers the Sign Up flow. The signup form appears as a "paper" overlay (lightbox). After the user successfully completes the form and taps the "save" button, the success message above prints out in the lightbox. Tapping "got it" takes the user to the blank machine list page 1) Sign Up/Log In view. After loading, if the user has not logged in or signed up, they may be presented with this page.
2) Sign Up Form. My choosing the "Sign Up" button, the user is presented with this Sign Up form. It is presented as a Modal.
3) Sign Up Success Message. Upon successful completion of the form, the users are presented with this success message. Tapping "Got it" dimisses the overlay and takes the user to the Machine List view.
4) Machine List (empty). Here the user is presented with the machine list view. If the user is new to Application (608*b*), this list may be empty.

Log In Flow. This sequence illustrates the steps a user has to take when logging into the Application (608*b*). After logging in the user is taken directly to the machine list. From the machine list, the user can browse and interact with their machines, sort the list of machines, search for a specific machine, or add a new machine.

1) Sign Up/Log In view. After loading, if the user has not logged in or signed up, they may be presented with this page.
2) Log In Form. My choosing the "Log In" button, the user is presented with this Log In form. It is presented as a Modal.
3) Machine List. Here the user is presented with the machine list view. If the user is new to Application (608*b*), this list may be empty. Here the list is populated.

Add Machine Flow. This sequence covers the Add Machine flow. To initiate the Add Machine flow, the user taps the "add" button in the tool bar. The succeeding view animates in as an ease in from the right side. Cancelling cancels action, "Save" saves entry and automatically returns to an updated Machine Details view (from the machine just added), which prints the new list item. The Add Machine form consists of a machine list drop down menu, avatar (which displays based on which machine is added), a "location" text field, cost text field, and "# of Balls per Game" text field.

1) Machine List (empty). Here the user is presented with the machine list view. If the user is new to Application (608*b*), this list may be empty. By tapping the "+" button the user initiates the "add machine" flow.
2) Add Machine Form. After tapping the "+" button, the user is presented with this form that consists of the above fields. Since there are a long list of games, that interaction is handled in as simple as way as possible.
3) Selecting a Machine from the List. In order for a user to select a machine from the list, they must tap on the "select machine" button in the previous view. This may open up a UI interface (like a contact list) where they can sort the list, or search for a title. This is necessary since there are so many games to choose from and the list is long. By tapping on the desired machine the user is taken back to the add form. To cancel this action, tapping on the back arrow in the app bar may take the user back to the add form.
4) After defining machine parameters. Once the user has filled in all the parameters from the form, hitting save may take them to the Machine List. Canceling may take the user back to the Machine list interface with not machine added—cancels action.
5) Machine List View. Once the user has added their new machine, they are taken to the list where they can see the machine populate it.

Delete Machine Flow. This sequence covers the Delete Machine Entry flow. The user can access the Delete function in the Edit Machine tab of the Machine Entry. Tapping the Delete This Machine button starts the delete sequence, which opens an overlay confirmation message. To fully delete the Machine Entry, the user must tap the button in the corner of the overlay message. Once the entry has been deleted, the user is automatically taken back to the machine list view.

1) Machine List. Here the user is presented with the machine list view. Tapping on list item (Machine) takes the user into the Machine Details View.
2) Machine Edit View. Here, the user can edit the Machine's Details—and in this case they can delete a machine. When attempting to delete a machine, the user is asked to confirm the delete request. Once completed, the user is taken back to the machine list where the machine may no longer be present.
3) Delete Machine Confirmation Message. Here the simple confirmation message seen is presented to the user when a delete request is made.
4) Machine List—One less. Here, the user sees the list without the deleted machine.

Editing a Machine's Details. This sequence covers the how a user edits a machine's details. The user can access the edit function in the Edit Machine tab of the Machine Entry. Tapping the any of the fields starts the edit sequence, which reveals "cancel" and "update buttons." Conversely, when this state is evoked the "Delete This Machine" button may be hidden. Committing to an update may take the user to a confirmation message. Canceling may revert all changes and return the user to the view unchanged.

1) Machine List. Here the user is presented with the machine list view. If the user is new to Application (608*b*), this list may be empty. Here the list is populated. Tapping on list item (Machine) takes the user into the Machine Details View.
2) Machine Edit View. Here, the user can edit the Machine's Details—and in this case they can delete a machine. When attempting to delete a machine, the user is asked to confirm the delete request. Once completed, the user is taken back to the machine list where the machine may no longer be present. Before the user starts an Edit, they may see the "Delete This Machine" button.
3) Updating Machine's Fields. Here the user is seen updating aspects of the machine. They can change the Venue, Cost, and Balls per Game. After an Edit has started, the "Delete This Machine" button is hidden and replaced by "Cancel" and "Update" buttons. These buttons may only persist in the Edit state.
4) Machine Edit View with new data. After selecting the new machine, the user is automatically taken back to the edit form. Here the user should see the updated Machine selection. Tapping "Update" button may the changes. This may result in a confirmation message, outlined in the next step. Tapping "Cancel" from here may simply revert any changes the user has made and replace this view to its original layout, with "Delete This Machine" revealed again and "Cancel" and "Update" being hidden.

5) Machine Edit View Edit Confirmation. Hitting the "Update" button may reveal this confirmation dialogue. To confirm, hit "Yes, Update." To cancel, hit "Cancel"
6) Machine Edit View with new data. Saving or canceling the changes hides the cancel and update buttons and reveals again the Delete This Machine button. Here the user's edits have been saved.
7) Machine List. Hitting the back arrow takes the user back to the Machine List.

Machine Details Flow. This sequence covers the Machine Details flow. By tapping on the Machine list item, the user has access to three tab browsing views: Data, Log, and Edit. Data is an analytics view, analogous to a web analytics dashboard and/or site. Log lists log events that are sortable and searchable. Edit allows the user to edit specific metadata aspects of the machine itself, including a delete function. The Edit view also auto-saves when changes are made, which then results in a log item. Badges are used as indicators for specific kinds of events—Critical (red) and Non Critical (yellow). An "Install Device (104)" button is present on all the tab views, so the user has access to that flow. All tab view states are scrollable within their wrappers. Both the app bar and tool bar are fixed position and cannot be scrolled away from.
1) Machine List. Here the user is presented with the machine list view. If the user is new to Application (608*b*), this list may be empty. Here the list is populated. Tapping on list item "Machine" takes the user into the Machine Details View.
2) Machine Data View. This tab is meant to show the user data analytics about the machine in a variety of ways. The Install Device (104) button is present in this view when a Device (104) has not been installed on a machine.
3) Machine Log View. Here the user has access to log events produced by the machine itself. This list may be sorted or searched through. In this case, the badge is an indication that the coin box is full and needs to be emptied. Red badges indicate more immediate physical problems, like the need for a repair, etc. The install Device (104) button is also present in this view, and is only present when a Device (104) has not been installed on the machine.
4) Machine Edit View. Here, the user can edit the Machine's Details—along with the delete function, the user can change the above aspects. Changing the field automatically updates the machine details. Install Device (104) is also accessible from this view.

Device (104) Install Flow. This sequence covers the Device (104) Install flow. When the user activates the Install Device (104) Flow from the Machine List item, they are guided through this step by step process. This process is lengthy and incorporates two steps where the user has to leave the app to reset the device's WiFi Access point. Essentially the Device (104) acts as a temporary WiFi Access point to initiate a handshake with Application (608*b*). Then, once completed, the device's location's original WiFi is reconnected to by the user and the Device (104) finishes connecting to the API (606).
1) Step 1—Introduction. Here, the user is introduced to the Install Device (104) flow and prepares them with a brief explainer about the process to follow.
2) Step 2—Confirm Wireless Settings. In this step, the user is asked to confirm the credentials of the local WiFi access point.
3) Post Step 2—Searching . . . . Here, the application searches for the Device (104)'s broadcast through the WiFi point.
4) Step 3—Connect to Device (104). In this step, after the Device (104) has been found, the user can now connect to the Device (104) as a WiFi access point. This facilitates the rest of the setup.
5) Post Step 3—Connecting . . . . Here, the user waits for the Device (104) to connect . . . .
6) Step 4—Device (104) Connected. In this step, the user is presented with the Device (104)'s SSID and is asked to save and continue. This saves the Device (104) to the user's account.
7) Step 5—Reconnect to local WiFi. In this step, the user is asked to leave the app and reconnect to the local WiFi.
8) Post Step 5—Reconnecting . . . . After the user has reconnected to local WiFi, the app looks for the Device (104) via the local WiFi access point. This is where the Device (104) connects to the API (606).
9) Step 6—Connected to API. Here, the user receives confirmation that the Device (104) has connected to the API (606).
10) Step 7—Install Successful Confirmation. In the final step, the user is presented with a success message pertaining to the install of the Device (104). Tapping the "Go To Machine List" button in the lower right hand corner takes the user back to their machine list.

In one embodiment, via the Player application (608*a*), a player may pay for a credit on the game. The application (608*a*) manages the payment, and the API (606) transmits the necessary control signal to the network access device (104) to increment the credit via the coin door interface (106) shown in FIG. 5B.

Another application that may be used is that of the service administration via an Administration application (608*c*). In one embodiment, the Administration application (608*c*) is run on a desktop, for example on Mac OS X with a GUI to be used by individuals to create sets of matching frames needed to configure custom hardware such as a new entertainment machine to be used with the device (104).

For example and without limitation, as pinball machines developed since the early 1990's have small, dot matrix screens on the "backbox". These displays are low resolution, for example 128×32 pixels. They present players with animated frames of scores, game information, credits, and other information relevant to the player.

Captures of these animations require that certain patterns are found and identified within these frames for another application. For each pinball machine, a file may contain anywhere from 50 to 500 unique frames, each one 128×32 pixels in resolution.

The purpose of this trainer application (608*c*) is to allow a user to move from frame to frame, find frames that answer specific questions the other applications (608*a*, 608*b*) require, and allow the user to "trace" the patterns and save them as answers to these questions. When finished, these patterns are saved in a file that may be used by another application (608*a*, 608*b*).

Upon execution, this application (608*c*) opens a window representing 128×32 pixels (as large, round dots). On the right is a Question/Category section. The File menu allows one to:

Open—Opens a pre-existing template file generated by the program. If a file already exists in some level of completion, this loads that file and allows a user to edit previous work or continue where they left off;

New Import—Loads a new set of frames, including a text file with the frames delimited however the developer wants. Frames may be provided either as pixels or in an encoded format, like hex, on a per frame basis. Each frame may have 32 rows of 128 pixels each, and then there may be some kind of frame break indicating a frame;

Save—Saves a template file generated by this program; and

Quit—Exits the program.

On the left side of the screen, there is a horizontal rectangle representing the dot matrix screen. The first frame is loaded, each pixel with some spacing between, representing the image. Each dot may be big enough that a mouseover highlights the edges of the dot. Each dot may be amber colored.

On the right side of the screen there may be the current "question" that needs answering. For example, the first question may say, "Find a frame with the words Player 1 or Player One, and trace the pixels with those words." Beneath the question is a left arrow button, a right arrow button, a "submit" button, and a "skip" button. A user may use the left arrow and right arrow to move forward and back from frame to frame.

Once a user finds a frame that says "Player 1" somewhere on the frame, the user may move the mouse over each pixel that says "Player 1," and when he/she clicks the mouse pointer over each pixel, it changes from amber to green. Once all the pixels that say "Player 1" is finished, the user clicks "Submit," and the information containing the coordinates and pixels highlighted may be recorded in a variable representing the question for Player 1. It then moves to the next question, which may be identifying Player 2. A user may skip a given question with the skip button and move to the next question.

Further examples of these questions:
Find and trace the words Player 1;
Find and trace the words Player 2;
Find and trace the words Player 3;
Find and trace the words Player 4;
Find and trace the words Ball 1;
Find and trace the words Ball 2;
Find and trace the words Ball 3;
Find and trace the words Ball 4;
Find and trace the words BONUS after a ball is completed/matching phrase;
Find and trace the word TILT;
Find and trace the words GAME OVER;
Find and trace, for each digit: Large Fonts—0 through 9;
Find and trace, for each digit: Medium Fonts—0 through 9;
Find and trace, for each digit: Small Fonts—0 through 9;
Find and trace, for each digit: Misc Font 1—0 through 9;
Find and trace, for each digit: Misc Font 2—0 through 9

Once each of these questions has been traced and submitted (or skipped), the application (608*c*) moves to the final phase: Score area mapping.

In Score area mapping, in the Question area, the text appears, "Please find a score frame that shows a score specific to Player 1. Note that this must be a frame that shows all the scores for all players together. Drag a box over the pixels that contain the Player 1 score.

The user may then drags a marquee box over the space specific to player 1. At this point, the user may either submit and move to the next question, or add another Player 1 area to repeat this question. They then hit submit or add, and it moves to the next question. If they clicked add, it may repeat for Player 1 and asks to repeat the same process. If they click Submit, it moves to Player 2. In the Question area, it repeats the same for player 2, 3 and 4, the same process.

Next, in the Question area, it says "Please find a score frame that lists the CURRENT player score on its own. These frames may be dedicated to scores, or be part of modes, and typically uses a larger font to fill more of the screen." Again, the user may drag a box over an area, and either submit and move on or add another area for this category.

Once all the score areas are complete, the user may save file template with each questions data, including coordinates and pixels, saved in a single file. The user may then exit or start a new Import.

Figure 7:
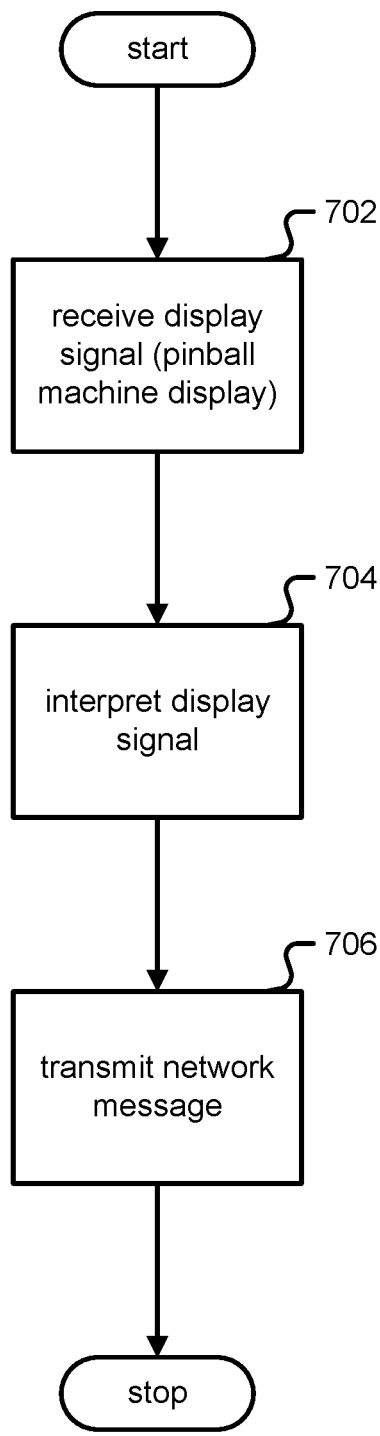
FIG. 7 is a flow chart illustrating an embodiment of a process for display network access for an entertainment machine.

FIG. 7 is a flow chart illustrating an embodiment of a process for display network access for an entertainment machine. In one embodiment, the process of FIG. 7 is carried out by network access device (104) in FIG. 2.

In step 702, a display signal is received. In one embodiment, the display signal is associated with a pinball machine display. In one embodiment, the display signal is received via a passive display probe. In one embodiment, the display signal is received via an active display probe, and an active display signal is provided to the pinball machine display. In one embodiment, the pinball machine display comprises at least one of the following: an electro-mechanical display, a solid state pinball display, a dot matrix display, and an HD (high definition) display.

In step 704, the display signal is interpreted. In one embodiment, the interpretation is based on training and/or optical character recognition.

In step 706, a network message is transmitted via a network interface based at least in part on the interpretation of the display signal. In one embodiment, the network message uses a communication protocol, wherein the communication protocol comprises at least one of the following: WiFi, Bluetooth, Bluetooth LE, NFC, Proximity, RJ-485, RJ-45, USB-C, USB 2.0, JTAG, LVDS, HDMI, and SDCard.

Figure 8:
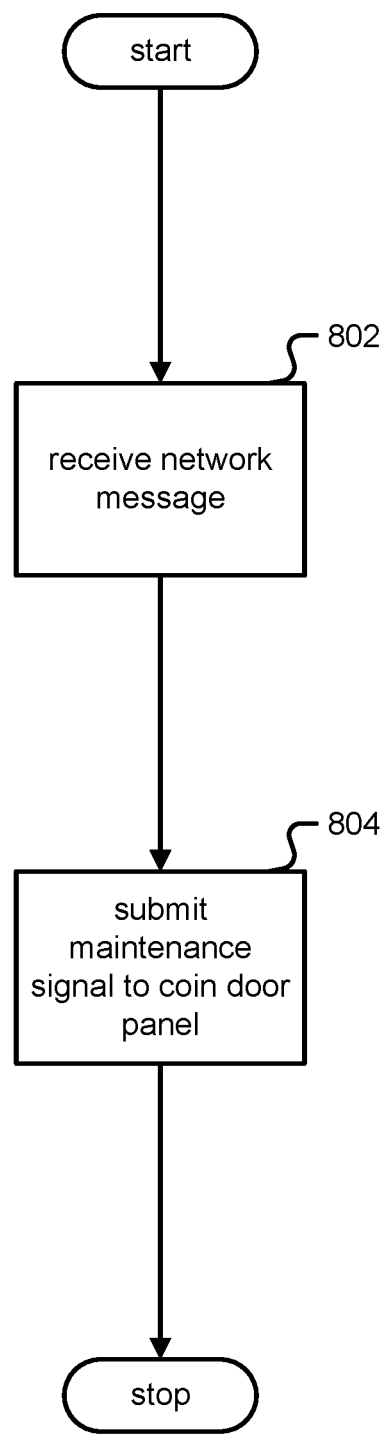
FIG. 8 is a flow chart illustrating an embodiment of a process for maintenance network access for an entertainment machine.

FIG. 8 is a flow chart illustrating an embodiment of a process for maintenance network access for an entertainment machine. In one embodiment, the process of FIG. 8 is carried out by network access device (104) in FIG. 2.

In step 802, a network message is received. In step 804 a maintenance signal associated with the network message is submitted via a communication interface. In one embodiment, the communication interface is a maintenance probe, for example an active maintenance probe. In one embodiment, the network message is submitted to a pinball CPU and/or MPU. In one embodiment, the maintenance probe is coupled to a pinball machine coin door panel and/or pinball machine coin door panel driver board.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a network interface;
a logic circuit coupled to the network interface and configured to:
    receive a display signal associated with a pinball machine display;
    interpret the display signal; and
    transmit a first network message via the network interface based at least in part on the interpretation of the display signal;

a second communication interface coupled to a pinball machine coin door panel driver board and to the logic circuit, wherein the second communication interface is coupled to a pinball machine coin door panel while coupled to the pinball machine coin door panel driver board; and wherein the logic circuit is further configured to:
receive a second network message; and
submit a maintenance signal via the second communication interface, wherein the maintenance signal is based at least in part on the second network message.

2. The system recited in claim 1, further comprising
a first communication interface coupled to a pinball machine display driver board and to the logic circuit; and
wherein the first communication interface is configured to receive the display signal from the display driver board and provide the display signal to the logic circuit.

3. The system recited in claim 2, wherein the first communication interface is a passive display probe.

4. The system recited in claim 2, wherein the first communication interface is an active display probe, and wherein the first communication interface is further configured to provide an active display signal to the pinball machine display.

5. The system recited in claim 2, wherein the first communication interface is coupled to a pinball CPU while coupled to the pinball machine display driver board.

6. The system recited in claim 2, wherein the first communication interface is coupled to the pinball machine display while coupled to the pinball machine display driver board.

7. The system recited in claim 1, wherein the second communication interface is a passive maintenance probe.

8. The system recited in claim 1, wherein the second communication interface is an active maintenance probe, and wherein the second communication interface is further configured to provide an active maintenance signal to a pinball machine CPU.

9. The system recited in claim 1, wherein the second communication interface is coupled to a pinball CPU while coupled to the pinball machine coin door panel driver board.

10. The system recited in claim 1, wherein the logic circuit comprises an FPGA (field programmable gate array).

11. The system recited in claim 1, wherein the logic circuit comprises a logic analyzer.

12. The system recited in claim 1, wherein the network interface uses a communication protocol, wherein the communication protocol comprises at least one of the following: WiFi, Bluetooth, Bluetooth LE, NFC, Proximity, RJ-485, RJ-45, USB-C, USB 2.0, JTAG, LVDS, HDMI, and SDCard.

13. The system recited in claim 1, wherein the pinball machine display comprises at least one of the following: an electro-mechanical display, a solid state pinball display, a dot matrix display, and an HD (high definition) display.

14. The system recited in claim 1, further comprising:
a third communication interface coupled to a pinball RAM board and to the logic circuit; and
wherein the logic circuit is further configured to:
receive a memory state associated with a pinball RAM associated with the pinball RAM board;
interpret the memory state; and
transmit a network message via the network interface based at least in part on the interpretation of the memory state.

15. The system recited in claim 1, further comprising:
a fourth communication interface coupled to a pinball CPU board and to the logic circuit; and
wherein the logic circuit is further configured to:
receive a processor state associated with a pinball CPU associated with the pinball CPU board;
interpret the processor state; and
transmit a network message via the network interface based at least in part on the interpretation of the processor state.

16. A system, comprising:
a network interface;
a logic circuit coupled to the network interface and configured to:
receive a display signal associated with a pinball machine display;
interpret the display signal, wherein interpreting comprises at least one of the following: training, optical character recognition, and machine learning; and
transmit a network message via the network interface based at least in part on the interpretation of the display signal.

17. A method, comprising:
receiving, using a logic circuit, a display signal associated with a pinball machine display;
interpreting, using the logic circuit, the display signal;
transmitting, using the logic circuit, a first network message via a network interface based at least in part on the interpretation of the display signal;
receiving, using the logic circuit, a second network message; and
submitting, using the logic circuit, a maintenance signal via a second communication interface, wherein the maintenance signal is based at least in part on the second network message, and wherein the second communication interface is coupled to a pinball machine coin door panel driver board and to the logic circuit, wherein the second communication interface is coupled to a pinball machine coin door panel while coupled to the pinball machine coin door panel driver board.

* * * * *

UNITED STATES PATENT AND TRADEMARK OFFICE
CERTIFICATE OF CORRECTION

PATENT NO.        : 10,561,930 B2
APPLICATION NO.   : 16/034315
DATED             : February 18, 2020
INVENTOR(S)       : Ronald John Richards et al.

It is certified that error appears in the above-identified patent and that said Letters Patent is hereby corrected as shown below:

In the Specification

In Column 3, Line 62, after "locally to", insert --be--.

In Column 8, Line 18, delete "the" and insert --that--, therefor.

In Column 14, Line 2, delete "it" and insert --is--, therefor.

Signed and Sealed this
Fifteenth Day of December, 2020

Andrei Iancu
*Director of the United States Patent and Trademark Office*